R. & W. T. Smith.
Amalgamator.
N° 76,538.      Patented Apr. 7, 1868.

WITNESSES:
Geo. P. Herthel Jr.
M. Randolph.

INVENTOR:
Robert Smith
William T. Smith

United States Patent Office.

ROBERT SMITH AND WILLIAM T. SMITH, OF CARONDELET, MISSOURI.

Letters Patent No. 76,538, dated April 7, 1868.

IMPROVEMENT IN AMALGAMATORS.

The Schedule referred to in these Letters Patent and making part of the same.

TO ALL WHOM IT MAY CONCERN:

Be it known that we, ROBERT SMITH and WILLIAM T. SMITH, of Carondelet, in the county of St. Louis, and State of Missouri, have made certain new and useful Improvements in Amalgamators; and we do hereby declare that the following is a full and clear description thereof, reference being had to the accompanying drawings, and to the letters of reference marked thereon.

The object of this invention is to produce an amalgamator for the reduction of argentiferous and auriferous ores in a more speedy and thorough manner than has yet been accomplished, and especially the auriferous sulphurets.

The invention consists in a peculiar arrangement of amalgam-troughs, having their bottoms inclined downward toward the back ends, which are set at an acute angle to the bottom. The troughs thus constructed are to be operated so that the mercury and ore will settle down into the acute angle at the back ends of the troughs, and there be convolved by the reciprocating action of the trough.

To enable those skilled in the art to make and use our improved amalgamator, we will proceed to describe its construction and operation.

Figure 1 of the drawings is a central sectional elevation of the improved amalgamator.

A framework, A, is erected, from the top-beams A' of which the amalgam-troughs B B' are suspended, by the rods b, or other equivalent devices. The ore to be reduced is to be delivered on the inclined flume C, mixed with a proper quantity of water, and is to pass thence to the troughs B, through the apertures c. The water from the troughs B, mixed with dirt and some ore, will pass out at the forward open end of the said troughs, and fall on the apron D, whence it will pass down, through the apertures d, into the troughs B', where it will be again agitated, as in B, and the water and dirt will again pass out at the open ends of the troughs, as before, and fall on the apron E, whence it will pass down into the trough F, and escape. As there are several of the troughs B placed side by side, and all receiving from the same flume, C, swivel-guide blocks, $c^1$, are placed on the floor of the flume, at the influence of the several chutes, $c^2$, so that, by turning the said guide-blocks to one side or the other, as occasion may require, the quantity of water and ore admitted to each may be thus regulated. Similar swivel-blocks, $d^1$, are likewise placed on the apron D, at the influence of the chutes $d^2$, for the purpose of regulating the quantity of water and ore passed to the troughs B'. The troughs B B' being suspended on the rods or chains b, as above described, they will be agitated by a longitudinal reciprocating motion imparted to them by the connecting-rods G, the said rods being actuated by cranks, on the driving-shaft H.

Figure 1:
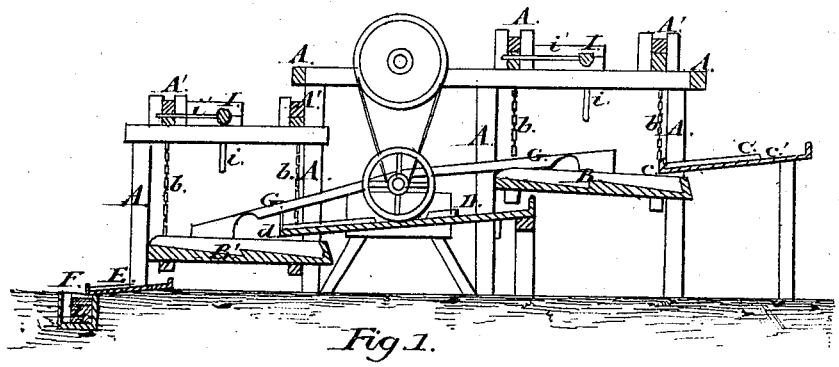
Figure 2:
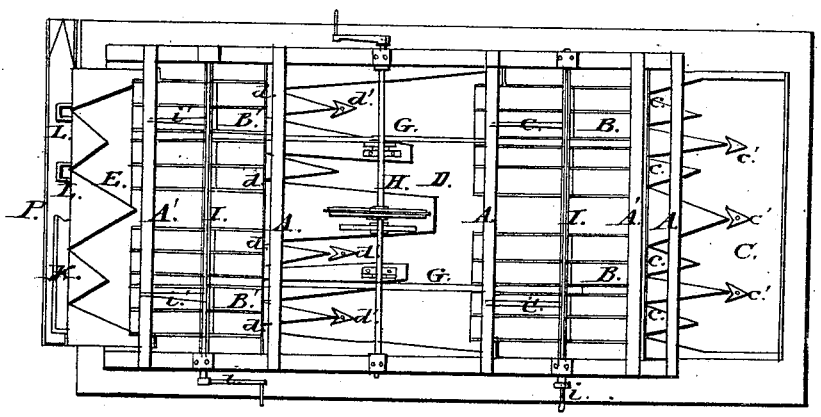
Figure 2 is a plan of the same.
Figure 3:
Figure 3 is a central sectional elevation of one of the troughs on an enlarged scale.

The bottoms of the troughs are to be stepped or serrated, as most clearly shown in fig. 3, and there may be two or more of these serrations to each of the troughs. While in operation, the bottoms of these steps will rise from the back end to the forward, at an angle of about ten degrees, (more or less,) and the rise at the back end of each step will form an acute angle with it, of about eighty degrees, (more or less.) Into the acute angle which is thus formed at b', the ore and mercury will be convolved in one mass by the reciprocating action of the trough, as is represented by the red lines in fig. 3, and the surplus water and dirt will run off over the top, and out at the front end of the trough, as is represented by the blue lines in fig. 3. This peculiar convolving motion imparted to the ore and mercury, as above set forth, has been found, by experiment, to be exactly calculated to extract the gold and silver from the dross or baser metals.

When the troughs are to be unloaded, the beams A', at the front ends of the troughs, will be slightly raised by turning the shafts I forward, by means of the handles i, when the arms i' will raise both ends of the beams up, and allow the operator to remove the blocks a from under the ends of the said beams A', which will then drop down, and allow the forward ends of the troughs to be depressed sufficiently to allow the contents to run out at the open ends of the troughs. The contents will then be secured in the boxes K, placed in the trough F, under the outlets of the apron E. Should accident or breakage of machinery occur, the small trays L might be instantly placed under the outlets of E, to receive the contents of the troughs.

Having described our invention, what we claim, is—

1. The amalgamating-troughs B B', when their bottoms are serrated, and acute angles, b', formed at the back end of each serration, as described and set forth.

2. We claim the combination of two or more sets of amalgamating-troughs, B B', with the delivery-flume C, and distributing-aprons D E, substantially in the manner and for the purpose herein shown and described.

3. We claim the swivel-guide blocks c and d, when applied to the flume C and apron D, as described and set forth.

4. We claim the arrangement of the shafts I, with their handles i, and levers or arms i', when employed as herein described and shown.

ROBERT SMITH,
WILLIAM T. SMITH,

Witnesses:
  M. RANDOLPH,
  GEO. P. HERTHEL, Jr.